United States Patent
Nishida

(12) 
(10) Patent No.: US 10,440,205 B1
(45) Date of Patent: Oct. 8, 2019

(54) IMAGE FORMING APPARATUS FORMING IMAGE ON PAPER

(71) Applicant: KYOCERA Document Solutions Inc., Osaka (JP)

(72) Inventor: Ryunosuke Nishida, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 16/356,302

(22) Filed: Mar. 18, 2019

(30) Foreign Application Priority Data

Mar. 28, 2018 (JP) .................................. 2018-063021

(51) Int. Cl.
*H04N 1/00* (2006.01)
*G03G 15/22* (2006.01)
*H04N 1/23* (2006.01)

(52) U.S. Cl.
CPC ....... *H04N 1/00336* (2013.01); *G03G 15/221* (2013.01); *H04N 1/00575* (2013.01); *H04N 1/2323* (2013.01); *H04N 1/2376* (2013.01)

(58) Field of Classification Search
CPC ........... H04N 1/00336; H04N 1/00575; H04N 1/2323; H04N 1/2376; G03G 15/221
USPC ........................................................ 358/1.16
See application file for complete search history.

(56) References Cited

U.S. PATENT DOCUMENTS

2016/0232769 A1* 8/2016 Jarvi .................. G01V 3/10

FOREIGN PATENT DOCUMENTS

| JP | 2002-247341 A | 8/2002 |
|---|---|---|
| JP | 2004-042449 A | 2/2004 |

* cited by examiner

*Primary Examiner* — Saeid Ebrahimi Dehkordy
(74) *Attorney, Agent, or Firm* — IP Business Solutions, LLC

(57) ABSTRACT

An image forming apparatus includes a paper reading section, a similarity judgment section, and a control section. Between a downstream side in a paper conveyance direction of the paper feed section and a position where image formation is performed, the paper reading section reads an existing image already formed on a surface opposite to a formation surface of a new image newly formed on paper by an image formation section. Based on image data of the new image and image data of the existing image obtained by the image formation section, the similarity judgment section judges similarity between the both images. The control section, upon judging that the similarity is high, causes a pattern image to be formed on a surface of the paper where the existing image is formed, and upon judging that the similarity is not high, does not cause the pattern image to be formed.

7 Claims, 8 Drawing Sheets

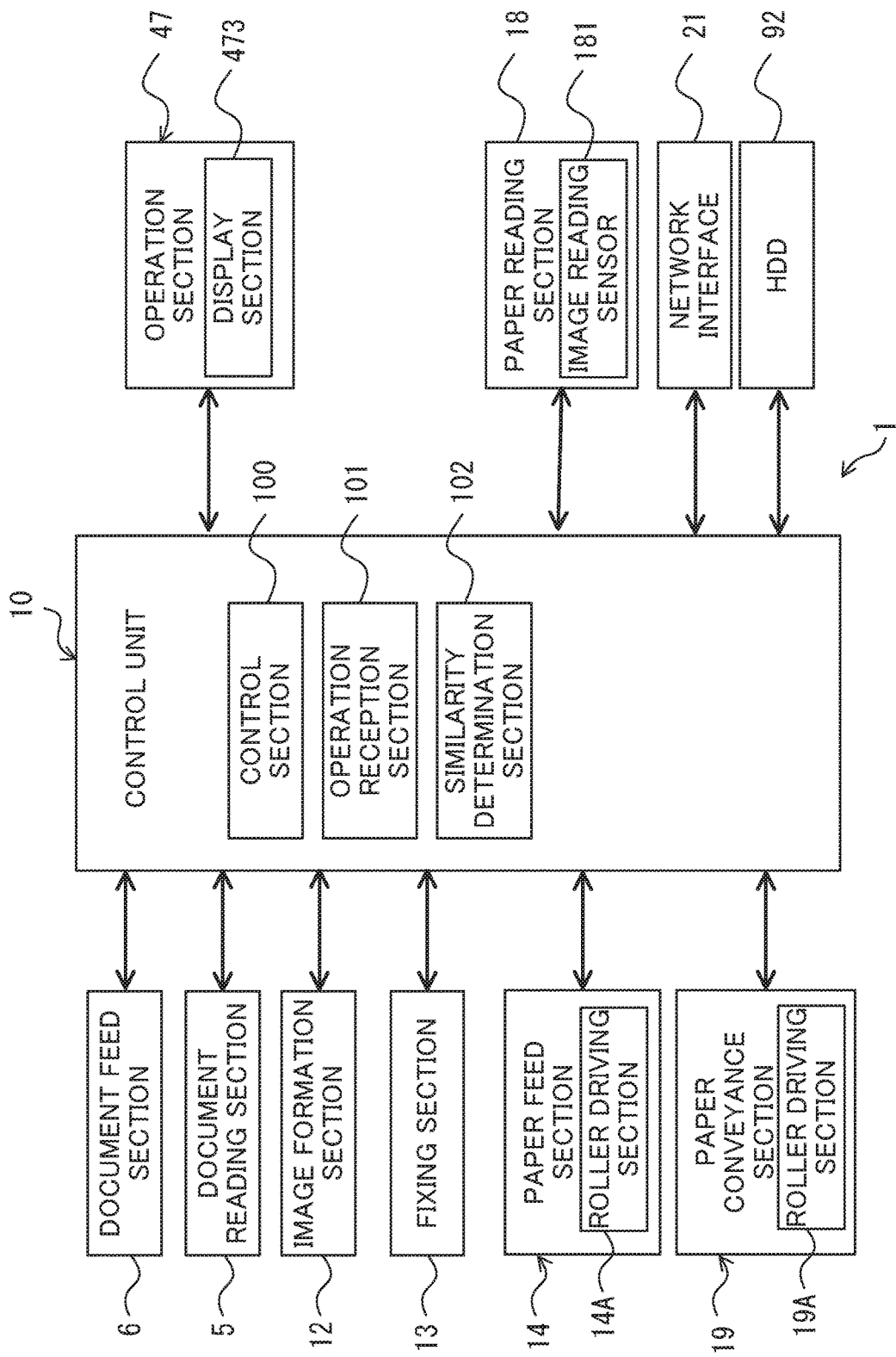

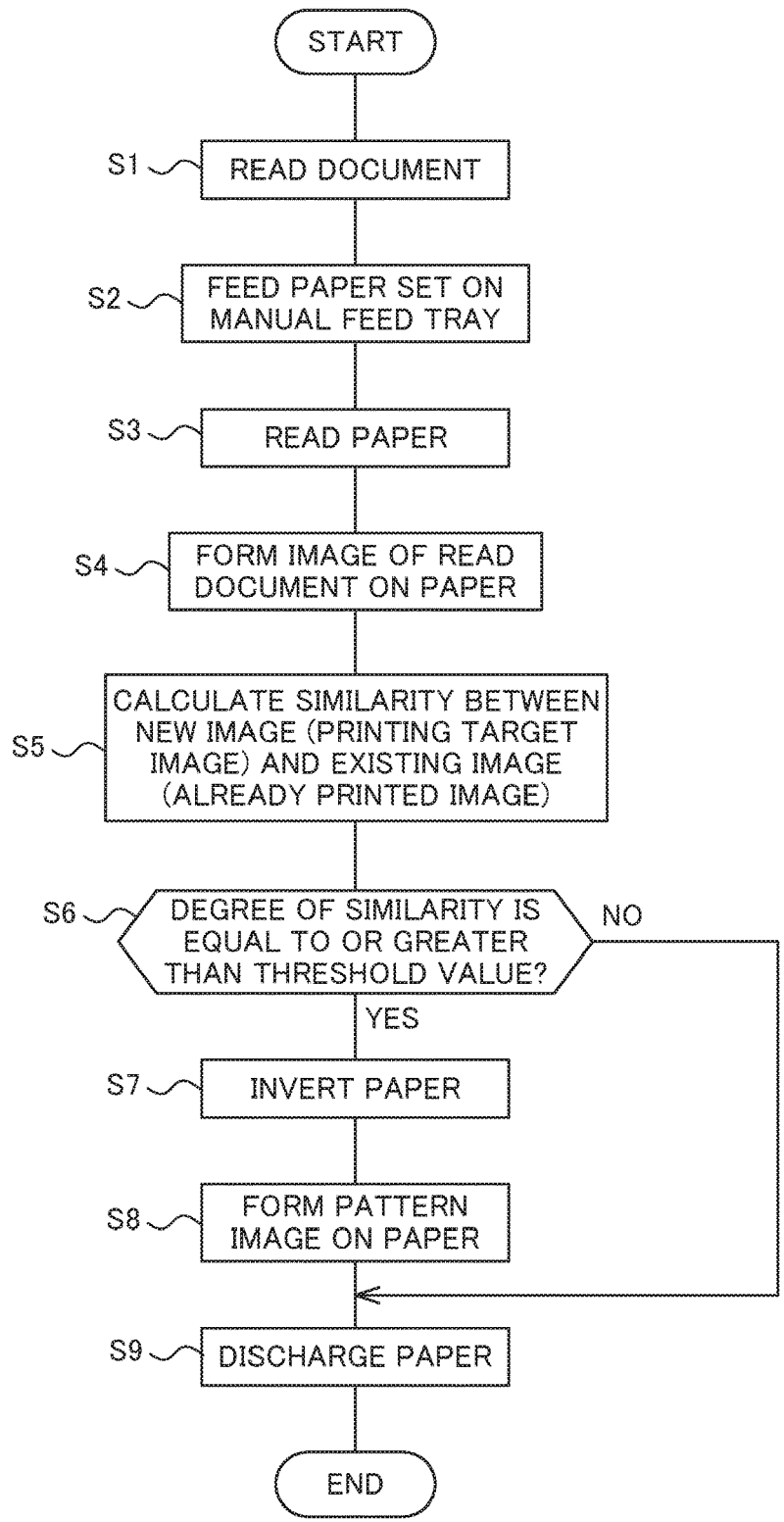

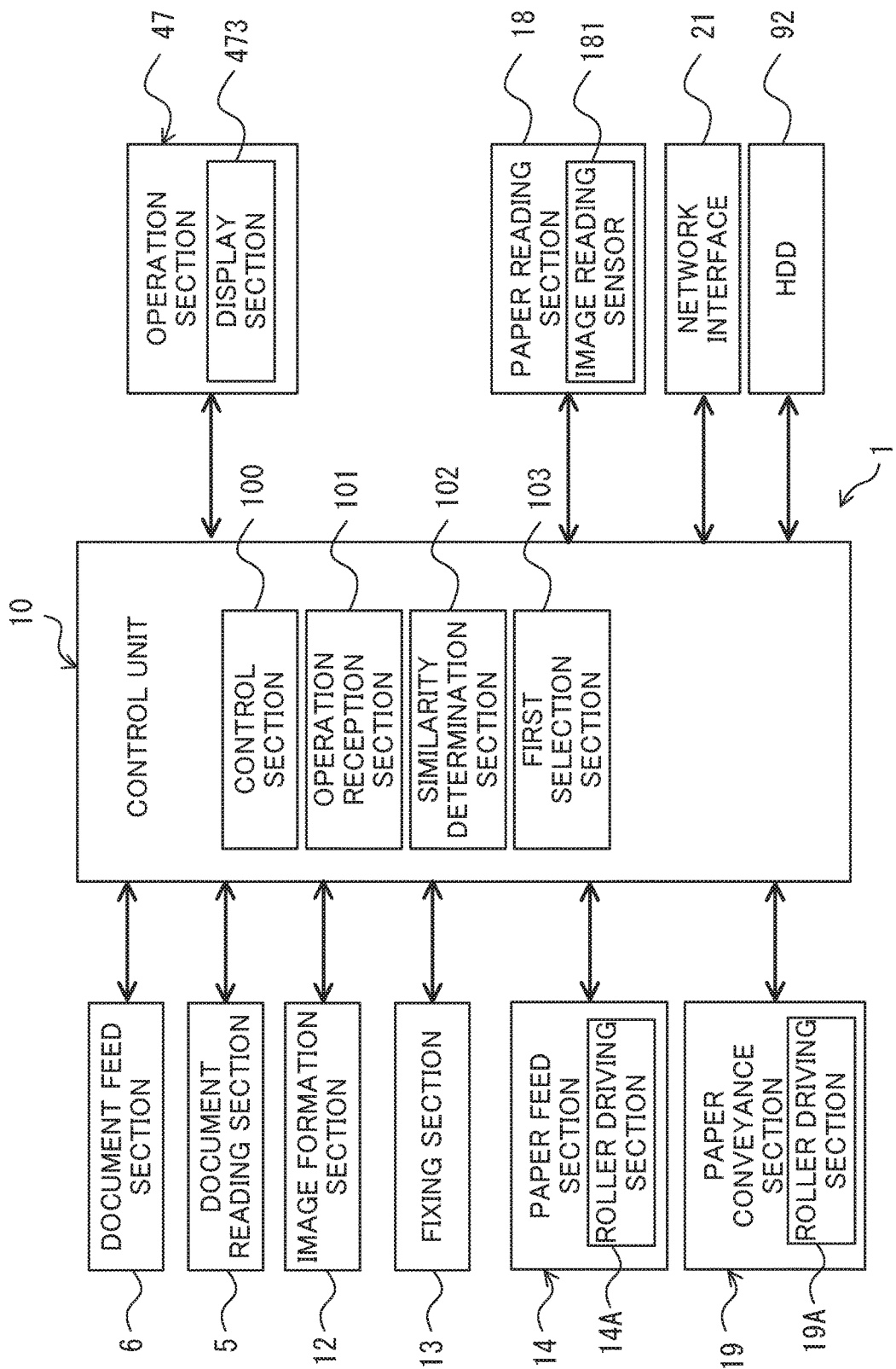

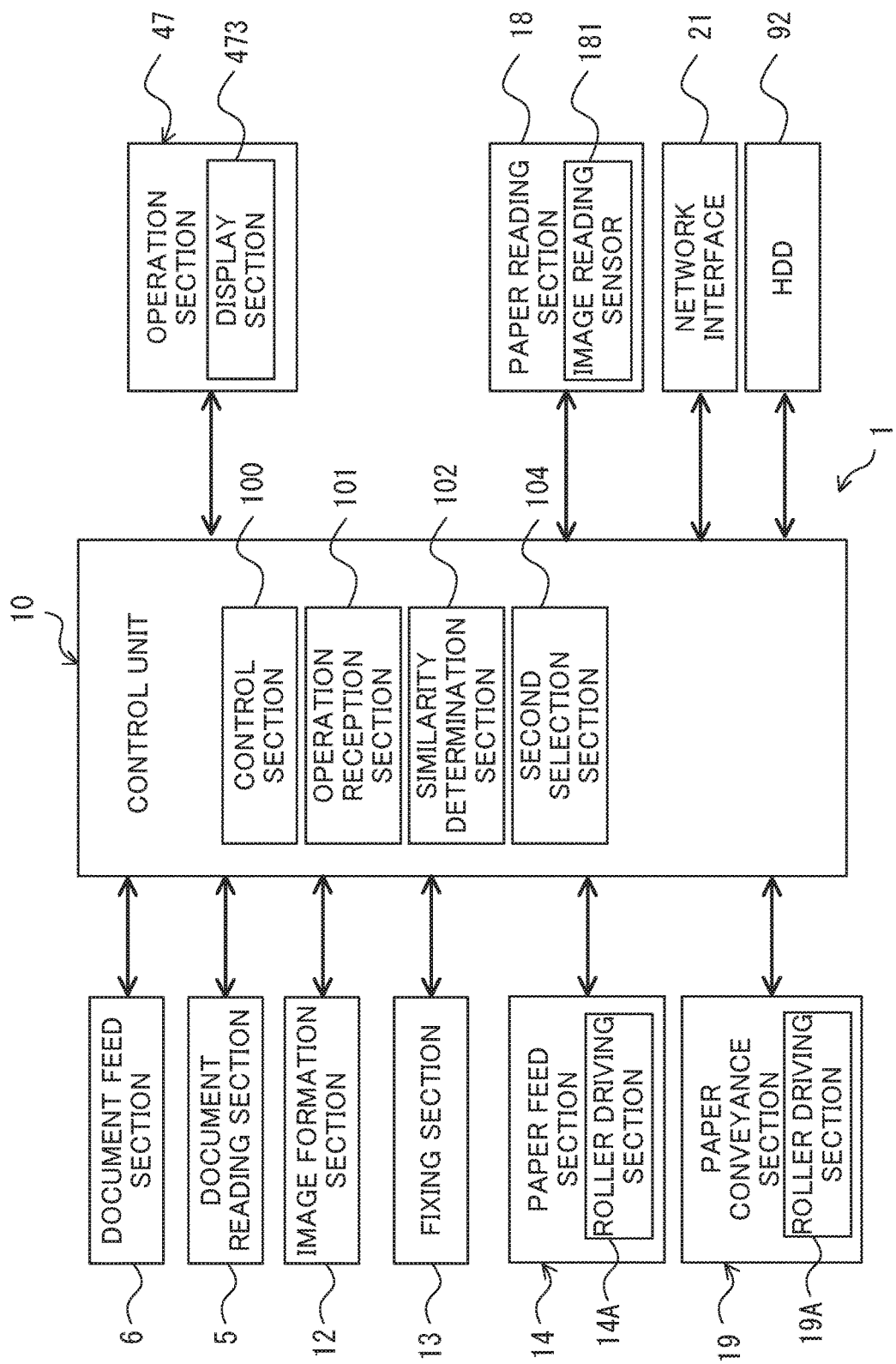

IMAGE FORMING APPARATUS FORMING IMAGE ON PAPER

INCORPORATION BY REFERENCE

This application claims priority to Japanese Patent Application No. 2018-063021 filed on Mar. 28, 2018, the entire contents of which are incorporated by reference herein.

BACKGROUND

The present disclosure relates to an image forming apparatus and more specifically to a technology of performing printing by recycling an unused surface of paper whose another surface has already been used.

There are image forming apparatuses which are capable of printing by recycling an unused surface of paper whose another surface has already been used. For the purpose of easier discrimination between a front surface (the surface recycled for the printing) and a rear surface upon performing the printing by recycling the unused surface of the paper whose another surface has already been used, the image forming apparatuses synthesize, with a new image to be newly printed on the front surface, an image different therefrom. For example, some image forming apparatuses synthesize, with the aforementioned new image, a message "Rear paper is used to save natural resource", and some image forming apparatuses synthesize, with the aforementioned new image, a pattern image formed over an entire surface of the paper.

Upon recycling the aforementioned unused surface, "show-through" may occur which makes it difficult to view the front surface printed as a result of rear surface printed and viewed in a translucent manner, but the difficulties in viewing the front surface printed due to the "show-through" is reduced by synthesizing, with the aforementioned new image, a grid-like cyclic pattern image as the aforementioned pattern image.

SUMMARY

A technology obtained by further improving the technology described above will be suggested as one aspect of the present disclosure.

An image forming apparatus according to one aspect of the present disclosure includes: a paper feed section, a paper conveyance section, an image formation section, a paper reading section, a storage section, and a control unit. The paper feed section feeds paper. The paper conveyance section has: a conveyance path through which the paper is conveyed from the paper feed section towards a discharge tray; and an inversion mechanism of inverting a front and a rear of the paper. The image formation section forms, on the paper fed from the paper feed section and conveyed through the conveyance path, an image indicated by image data subjected to image formation. The paper reading section has an image reading sensor being provided, so as to be at a position opposing the conveyance path, between a downstream side in a paper conveyance direction of the paper feed section and a position where the image formation is performed by the image formation section, and reads, by the image reading sensor, an existing image already formed on a surface opposite to a formation surface of a new image newly formed on the paper based on the image data subjected to the image formation by the image formation section. The storage section stores a pattern image. The control unit includes a processor and, as a result of execution of a control program by the processor, functions as a similarity judgment section and a control section. The similarity judgment section judges, based on the image data subjected to the image formation and image data of the existing image obtained through the reading performed by the image reading section, similarity between the new image and the existing image. The control section, upon judging by the similarity judgment section that the similarity between the new image and the existing image is high, controls the paper conveyance section and the image formation section to cause the image formation section to form the pattern image stored in the storage section on a surface of the paper where the existing image is formed, and upon not judging by the similarity judgment section that the similarity between the new image and the existing image is high, does not cause the image formation section to form the pattern image on the paper.

BRIEF DESCRIPTION OF THE DRAWINGS

FIG. 2 is a functional block diagram schematically illustrating a main inner configuration of the image forming apparatus according to the first embodiment.

FIG. 3 is a flowchart illustrating one example of processing performed in a control unit of the image forming apparatus according to the first embodiment.

FIG. 6 is a functional block diagram schematically illustrating a main inner configuration of an image forming apparatus according to a second embodiment.

FIG. 8 is a functional block diagram schematically illustrating a main inner configuration of an image forming apparatus according to a third embodiment.

DETAILED DESCRIPTION

Figure 1:
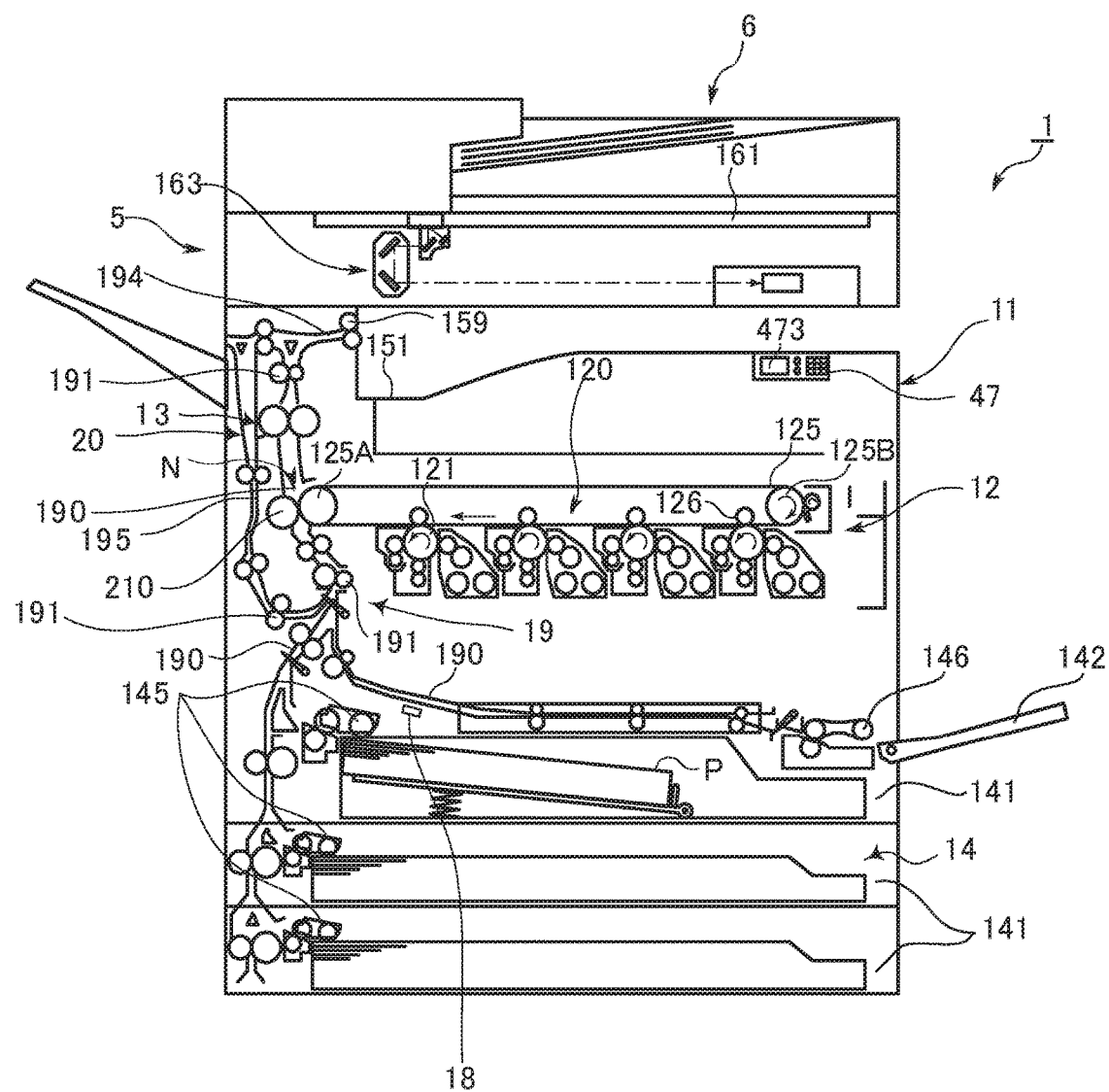
FIG. 1 is a partial sectional elevation view schematically illustrating a configuration of an image forming apparatus according to a first embodiment of the present disclosure.

Hereinafter, an image forming apparatus according to one embodiment of the present disclosure will be described with reference to the drawings. FIG. 1 is a partial sectional elevation view schematically illustrating configuration of the image forming apparatus according to one embodiment of the present disclosure. An image forming apparatus 1 is, for example, a multifunction peripheral combining together a plurality of functions such as a copy function, a printer function, a scanner function, and a facsimile function, and includes, in an apparatus body 11, an operation section 47, a document feed section 6, a document reading section 5, an image formation section 12, a fixing section 13, a paper feed section 14, a paper conveyance section 19, and a paper reading section 18.

The operation section 47 receives, from an operator, instructions such as an image formation operation execution instruction for various types of operation and processing executable by the image forming apparatus 1. The operation section 47 includes a display section 473 which displays, for example, an operation guide to the operator. The display section 473 is a touch panel and the operator can touch a button or a key displayed on a screen to operate the image forming apparatus 1.

A case where document reading operation is performed in the image forming apparatus 1 will be described. The document reading section 5 optically reads an image of a document fed by the document feed section 6 or a document loaded on contact glass 161 to generate image data. The image data generated by the document reading section 5 is saved into, for example, an image memory, not illustrated.

The document reading section 5 includes a reading mechanism 163 having a light source emission section, a charge coupled device (CCD) sensor, etc. The document reading section 5 irradiates a document by use of a light emission section having a light source and receives light reflected therefrom at the CCD sensor, thereby reading the image from the document.

A case where the image formation operation is performed in the image forming apparatus 1 will be described. Based on, for example, the image data generated through the document reading operation, the image data stored in the image memory or the like, image data received from a computer connected to a network, the image formation section 12 forms a toner image on paper P fed from the paper feed section 14 and conveyed by the paper conveyance section 19.

The paper feed section 14 includes a plurality of paper feed cassettes 141. A paper feed roller 145 is provided above each of the paper feed cassettes 141, and the paper P stored in the paper feed cassette 141 is delivered towards a conveyance path 190 by the paper feed roller 145.

The paper feed section 14 also includes a manual feed tray 142 provided in an openable and closeable manner on a wall surface of the apparatus body 11 and a paper feed roller 146. The paper P set on the manual feed tray 142 is delivered towards the conveyance path 190 by the paper feed roller 146.

The paper conveyance section 19 includes: the conveyance path 190 through which the paper P is conveyed from the paper feed section 14 towards a discharge tray 151; and a conveyance roller pair 191 which is provided at an appropriate place of the conveyance path 190. The paper P fed from the paper feed section 14 is conveyed to an inside of the conveyance path 190 by the conveyance roller pair 191. The paper conveyance section 19 is also provided with an inversion mechanism 20 which inverts a front and a rear of the paper P, and the paper P is switched back by a discharge roller pair 159, which is a part of the inversion mechanism 20.

The image formation section 12 forms an image on the paper P fed from the paper feed section 14 and conveyed through the conveyance path 190, and includes black, yellow, cyan, and magenta photosensitive drums 121 and a transfer unit 120. The photosensitive drums 121 are so configured as to be rotationally driven counterclockwise in the figure.

A transfer unit 120 includes: an intermediate transfer belt 125 to an outer circumferential surface of which a toner image is transferred; a driving roller 125A, a driven roller 125B, and a primary transfer roller 126.

The intermediate transfer belt 125 is stretched between the driving roller 125A and the driven roller 125B, and is driven by the driving roller 125A while abutting a circumferential surface of the photosensitive drum 121, and endlessly runs in synchronization with the photosensitive drum 121.

Upon color printing, based on image data subjected to image formation, the image formation section 12 forms a toner image on the photosensitive drum 121 through charging, exposure, and development processes, and transfers the toner image onto the intermediate transfer belt 125 by the primary transfer roller 126.

The toner images of the respective colors (black, yellow, cyan, and magenta) transferred onto the intermediate transfer belt 125 are superposed on each other on the intermediate transfer belt 125, turning into a color image.

At a nip part N formed with the driving roller 125A with the intermediate transfer belt 125 in between, a secondary transfer roller 210 transfers the color toner image, which has been formed on a surface of the intermediate transfer belt 125, onto the paper P conveyed from the paper feed section 14 thorough the conveyance path 190.

Then the fixing section 13 fixes, onto the paper P, the toner image formed on the paper P through thermal fixation. The paper P which has already been subjected to fixation processing and on which the image formation has been completed passes through a discharged paper conveyance path 194 (part of the conveyance path 190) so provided as to extend to an upper part of the fixing section 13 and is discharged onto the discharge tray 151 by the discharge roller pair 159.

Upon double-sided printing, the paper P on one surface of which the image has been formed by the image formation section 12 is brought to be sandwiched by the discharge roller pair 159, then the paper P is switched back by the discharge roller pair 159 and fed to an inverted conveyance path 195 (part of the conveyance path 190), and the paper P is conveyed again by the conveyance roller pair 191 to an upstream area in a conveyance direction. Consequently, an image is also formed on another surface of the paper P.

The paper reading section 18 has an image reading sensor 181 which is provided at a position opposing the conveyance path 190 between a downstream side in a paper conveyance direction of the paper feed section 14 (the manual feed tray 142) and a position (the nip part N) where the image formation is performed by the image formation section 12, and the paper reading section 18 reads an existing image already formed on a surface opposite to a formation surface of a new image newly formed on the paper P by the image formation section 12. Note that examples of the image reading sensor 181 include a contact image scanner (CIS).

FIG. 2 is a functional block diagram schematically illustrating main inner configuration of an image forming apparatus according to a first embodiment. The image forming apparatus 1 includes: a control unit 10, the document feed section 6, the document reading section 5, the image formation section 12, the fixing section 13, the paper feed section 14, the paper conveyance section 19, the operation section 47, and the paper reading section 18. Note that the same component portions as those of the image forming apparatus 1 illustrated in FIG. 1 are provided with the same numerals and are omitted from a detailed description here.

The paper feed section 14 and the paper conveyance section 19 respectively include roller driving sections 14A and 19A (see FIG. 2). The roller driving sections 14A and 19A are each composed of: a motor, a gear, a driver, etc. The roller driving section 14A fulfills a function as a driving source which provides a rotational driving force to paper feed rollers 145 and 146. The roller driving section 19A fulfills a function as a driving source which provides a rotational driving force to driving rollers of the conveyance roller pair 191 and the discharge roller pair 159.

A hard disk drive (HDD) 92 is a storage device, which stores a pattern image for discrimination between a front and a rear of paper. Examples of the pattern image include: an image formed over an entire surface of the paper P by the image formation section 12; and an image formed in a predefined margin region of the paper P. The pattern image is stored in the HDD 92. Note that the HDD 92 is one example of a storage section in the scope of the claims.

The control unit 10 includes: a processor, a random access memory (RAM), a read only memory (ROM), and a dedicated hardware circuit. The processor is, for example, a central processing unit (CPU), an application specific integrated circuit (ASIC), or a micro processing unit (MPU). The control unit 10 includes a control section 100, an operation reception section 101, and a similarity judgment section 102.

The control unit 10 functions as the control section 100, the operation reception section 101, and the similarity judgment section 102 as a result of operation performed in accordance with a control program stored int the HDD 92. However, the control section 100, etc. can each be formed by a hardware circuit without depending on the operation performed in accordance with the control program by the control unit 10. Hereinafter, the same applies to each embodiment unless otherwise is specified.

The control section 100 is in charge of overall operation control of the image forming apparatus 1. The control section 100 is connected to the document feed section 6, the document reading section 5, the image formation section 12, the fixing section 13, the paper feed section 14, the paper conveyance section 19, the operation section 47, and the paper reading section 18, and performs, for example, driving control of these sections.

The operation reception section 101 receives operation input from a user via the operation section 47. For example, upon reception of a user instruction for executing a print job (for example, copying or printing) by the operation reception section 101, the control section 100 controls operation of the paper feed section 14, the paper conveyance section 19, and the image formation section 12 based on the image data instructed by the user and subjected to image formation, thereby forming an image on the paper P fed by the paper feed section 14.

Based on image data of a new image newly formed on the paper P by the image formation section 12 and image data of the existing image obtained through the reading performed by the paper reading section 18, the similarity judgment section 102 judges similarity between the new image and the existing image. For example, the similarity judgment section 102 detects a degree of sameness between the both images through a known pattern matching technique, thereby judging to what degree the new image and the existing image are similar to each other.

Next, one example of processing performed in the control unit 10 of the image forming apparatus 1 according to the first embodiment will be described with reference to a flowchart illustrated in FIG. 3. This processing is performed (i) when an instruction for using the paper P set on the manual feed tray 142 and a copy instruction have been received at the operation reception section 101 through operation of the operation section 47 by the user or (ii) when the aforementioned instruction for using the paper P set on the manual feed tray 142 has been received from the user by a network interface 21 and data subjected to image formation have been received from a personal computer or the like connected to the image forming apparatus 1 via the network by the network interface 21. A case of (i) will be described as an example below.

Upon reception of the copy instruction from the user by the operation reception section 101, the control section 100 causes the document reading section 5 to read an image of the document loaded on the contact glass 161 or the document fed by the document feed section 6 (S1). Subsequently, the control section 100 controls operation of the paper feed section 4 (the roller driving section 14A), thereby causing the paper P set on the manual feed tray 142 to be fed towards the conveyance path 190 (S2).

At this point, the control section 100 causes the paper reading section 18 to read an image of the paper P fed from the manual feed tray 142 and conveyed through the conveyance path 190 (the existing image formed on a surface (a surface serving as a lower surface in FIG. 1) opposite to a surface on which the new image is formed) (S3), and controls operation of the paper conveyance section 19 (the roller driving section 19A) and the image formation section 12, thereby causing the image formation section 12 to form, on the paper P, the image based on the image data (data subjected to image formation) obtained through the reading performed by the document reading section 5 (S4).

The similarity judgment section 102 calculates a degree of the similarity between the new image and the existing image based on the image data of the new image (the image data of the document obtained through the reading performed by the document reading section 5) and the image data of the existing image (the image data of the paper obtained through the reading performed by the paper reading section 18 (S5). A value of the degree of similarity increases with an increase in the similarity between the both images.

The similarity judgment section 102 judges whether or not the degree of similarity between the new image and the existing image is equal to or greater than a predefined threshold value (S6). Upon judgment by the similarity judgment section 102 that the degree of similarity between the new image and the existing image is equal to or greater than the aforementioned threshold value (for example, the sameness between the both images detected through the pattern matching is 70%) (that is, the similarity between the both images is high) (YES in S6), the control section 100 controls the operation of the paper conveyance section 19, thereby inverting the front and rear of the paper P with the inversion mechanism 20 and bringing, towards the image formation section 12, the paper P whose front and rear have been inverted (S7).

Then the control section 100 controls the operation of the image formation section 12, causing the pattern image previously stored in the HDD 92 (for example, a pattern image G1 illustrated in FIG. 4A to be described later on) to be formed on a surface of the paper P where the existing image is formed (S8), and controls the operation of the paper conveyance section 19, causing the paper P to be discharged onto the discharge tray 151 (S9).

On the other hand, upon judgment by the similarity judgment section 102 that the degree of similarity between the new image and the existing image is less than the aforementioned threshold value (that is, the similarity between the both images is not high) (NO in S6), the control section 100 controls the operation of the paper conveyance section 19, thereby causing discharge of the paper P onto the discharge tray 151 (S9). In this case, the processing in S7 and S8 is not performed.

Figure 4A:
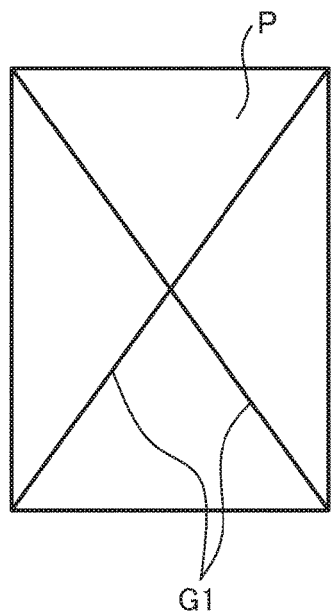
FIGS. 4A, 4B, and 4C are diagrams each illustrating one example of a pattern image.
Figure 4B:
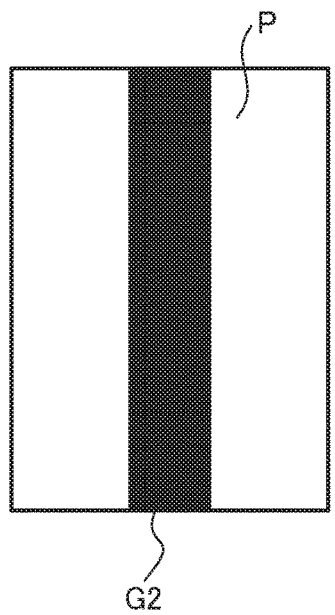
Figure 4C:
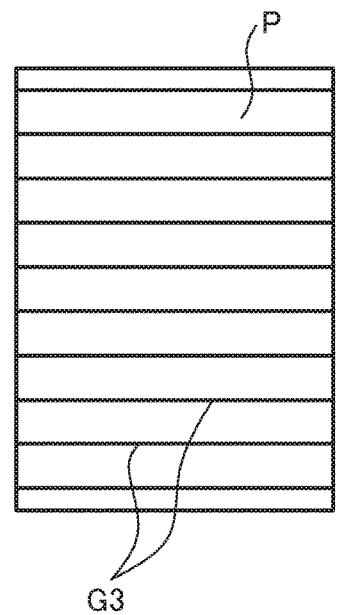

FIGS. 4A, 4B, and 4C are diagrams each illustrating one example of the pattern image. The pattern images G1 to G3 are those which are formed over the entire surface of the paper P. The pattern image G1 illustrated in FIG. 4A is "x", the pattern image G2 illustrated in FIG. 4B is a band-like image which vertically extends at a central part in a width direction of the paper P, and the pattern image G3 illustrated in FIG. 4C is an image formed of a plurality of thin lines which extend in the width direction of the paper P and which are arrayed in parallel to and separately from each other.

The pattern images G1 to G3 respectively illustrated in FIGS. 4A, 4B, and 4C are images which are formed over the entire surface of the paper P. Thus, as a result of forming any of the pattern images G1 to G3 on a surface of the paper P where the existing image is formed, it is possible for the user to easily discriminate the front and the rear of the paper.

Figure 5A:
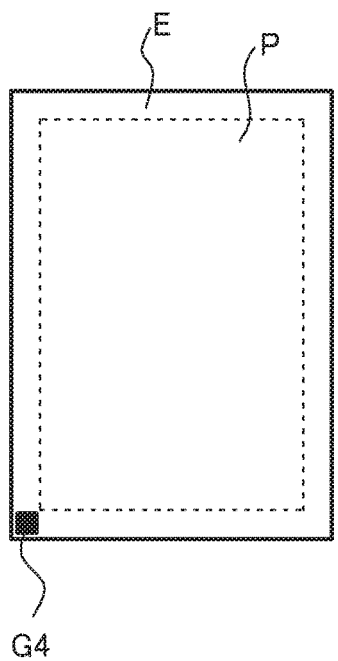
FIGS. 5A, 5B, and 5C are diagrams each illustrating another example of the pattern image.
Figure 5B:
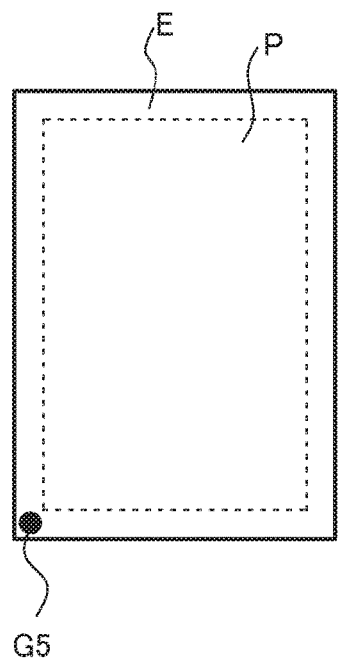
Figure 5C:
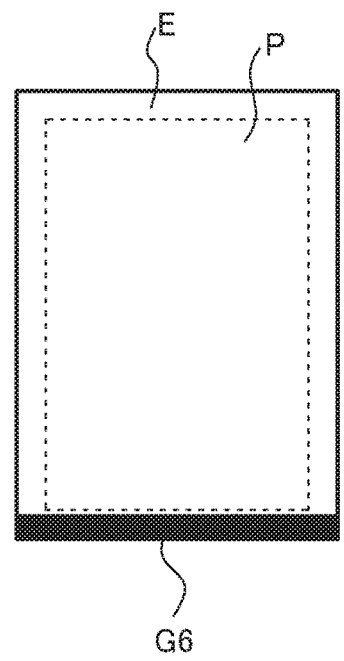

FIGS. 5A, 5B, and 5C are diagrams each illustrating another example of the pattern image, and pattern images G4 to G6 are images which are formed in a predefined margin region E of the paper P. The margin region E is a region which may be set as a margin in document printing on the paper P in many cases. For example, in a case of A4-sized paper, the margin region E is a region which extends over 150 mm from an edge part to an inner side of the paper, for example, a region located outside of broken lines illustrated in FIGS. 5A to 5C. The pattern image G4 illustrated in FIG. 5A is a rectangular image formed at a corner part of the paper P. The pattern image G5 illustrated in FIG. 5B is a circle image formed at the corner part of the paper P The pattern image G6 illustrated in FIG. 5C is a bold line image formed at an end part of the paper P.

Upon formation of the pattern images G1 to G3 respectively illustrated in FIGS. 4A, 4B, and 4C on a rear surface where the existing image is formed, there is a risk that the new image printed on a front surface becomes hardly visible as a result of show-through. On the contrary, since the pattern images G4 to G6 are formed in the margin region E, any of the pattern images G4 to G6 can be formed on a rear surface of the paper P where the existing image is formed to thereby avoid the front surface printing from becoming hardly visible as a result of the show-through.

According to the first embodiment described above, in a case where the similarity between the new image and the existing image is high, a prepared pattern image formed on the paper P where the existing image is formed (that is, the pattern image previously stored in the HDD 92) is formed, and in a case where the similarity between the new image and the existing image is not high, the pattern image is not formed on the paper P Therefore, in a case where the similarity between the new image and the existing image is not high (it is recognized that the user can easily make discrimination between the front and the rear) upon printing performed by recycling an unused surface of the paper P whose another surface has already been used, special image printing (pattern image formation) for the discrimination between the front and the rear is not performed, thus suppressing wasteful toner or ink consumption.

Moreover, since the pattern image for the discrimination between the front and the rear is formed not on the new image but on the surface of the paper P where the existing image is formed, the aforementioned pattern image does not overlap the new image newly printed on the recycled printing surface and also quality of the new image is not deteriorated.

In the image forming apparatus described in the background art above, since a synthetic image for enabling discrimination between the front and the rear is printed on the front surface as the recycled printing surface, the new image to be newly printed on the front surface overlaps the aforementioned synthetic image, so that an image other than the new image is consequently printed on the front surface, deteriorating quality of the new image, which makes the new image hardly visible.

Moreover, in the image forming apparatus described in the background art above, the new image to be newly printed on the front surface (the recycled printing surface) and the existing image already printed on the rear surface greatly differ from each other, and even in a case where the user can instantly discriminate the front and the rear, the synthetic image for the discrimination between the front and the rear is printed, thus deteriorating the quality of the new image as described above and also resulting in a cost increase as a result of wasteful toner or ink consumption.

On the contrary, in the present embodiment, upon performing printing by recycling the unused surface of the paper whose one surface has already been used, it is possible not to wastefully perform special image printing for the discrimination between the front and the rear and further not to cause the special image to overlap the new image newly printed on the recycled printing surface.

Note that for the pattern images, the six types of pattern images G1 to G6 as illustrated in FIGS. 4A to 4C and 5A to 5C may previously be stored in the HDD 92 and the operation reception section 101 may receive previous selection from the user, and the control section 100 may cause the pattern image, the selection of which has been accepted by the operation reception section 101, to be formed on the paper P upon the formation of the pattern images.

FIG. 6 is a functional block diagram schematically illustrating main inner configuration of an image forming apparatus according to a second embodiment. The image forming apparatus according to the second embodiment differs from the image forming apparatus 1 according to the first embodiment illustrated in FIG. 2 in a point that a plurality of pattern images are previously stored in the HDD 92 and further the control unit 10 includes a first selection section 103. Through operation performed in accordance with the control program stored in the HDD 92, the control unit 10 functions as a control section 100, an operation reception section 101, a similarity judgment section 102, and the first selection section 103.

The first selection section 103 judges, based on the image data of the new image and image data of the pattern image, similarity between the new image and the pattern image (a judgment technique is the same as that of the similarity judgment section 102), and selects, from the plurality of pattern images previously stored in the HDD 92, the pattern image having low similarity to the new image.

Figure 7:
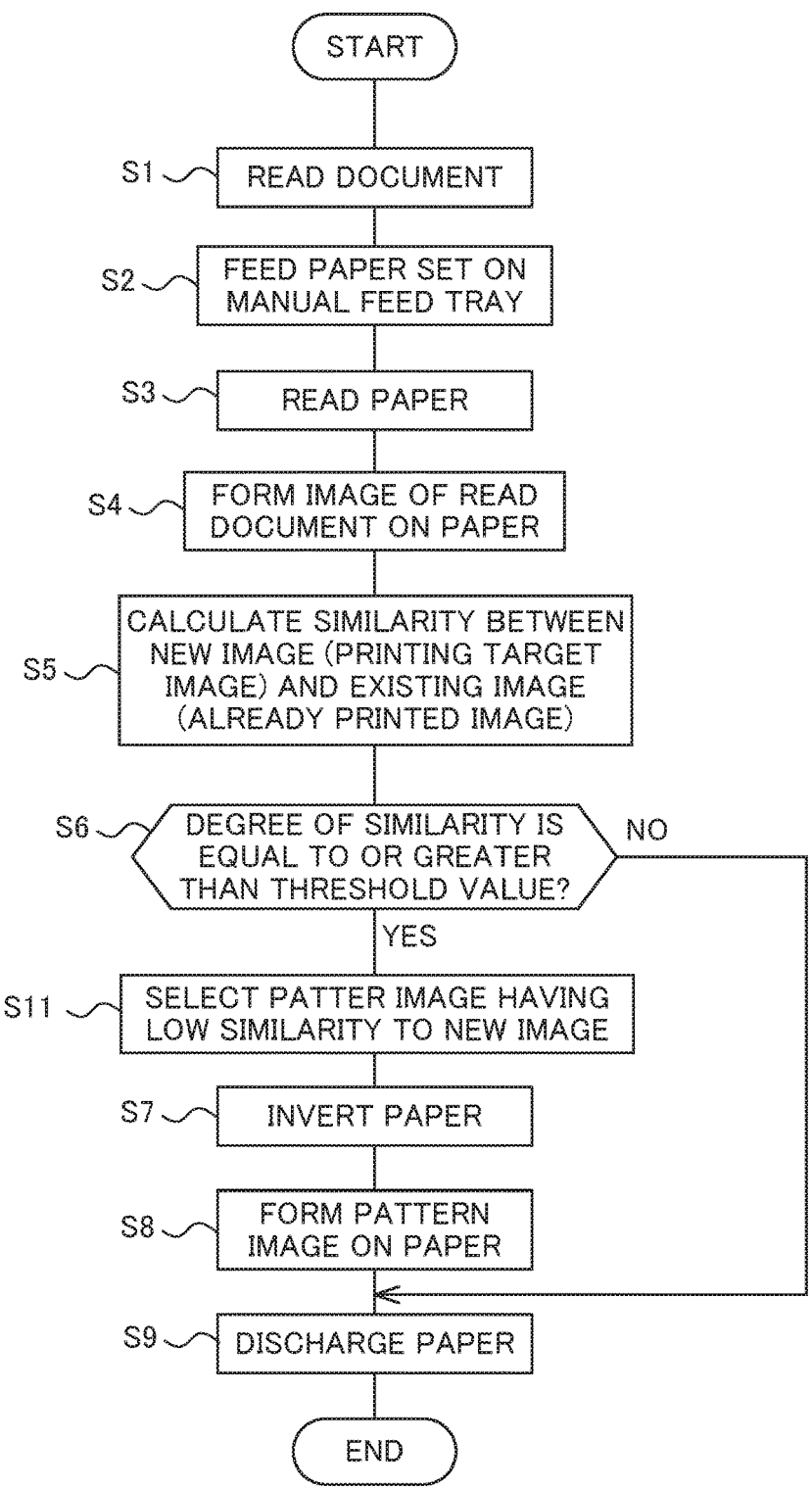
FIG. 7 is a flowchart illustrating one example of processing performed in a control unit of the image forming apparatus according to the second embodiment.

Next, one example of processing performed in the control unit 10 of the image forming apparatus 1 according to the second embodiment will be described based on a flowchart illustrated in FIG. 7. Note that the flowchart illustrated in FIG. 7 is the same as the flowchart illustrated in FIG. 3 except for the processing S11 performed after judgment of YES in S6, and thus the description will start from the processing S6.

In S6, upon judgment by the similarity judgment section 102 that the degree of similarity between the new image and the existing image is equal to or greater than a predefined threshold value (that is, the similarity between the both images is high) (YES in S6), the first selection section 103 judges the similarity between the new image and the pattern image based on the image data of the new image and the image data of the pattern image, and selects, from the plurality of pattern images previously stored in the HDD 92, the pattern image having low similarity to the new image (S11).

For example, in a case where the plurality of pattern images previously stored in the HDD 92 are the three types of pattern images G1 to G3 (FIGS. 4A, 4B, and 4C), the first selection section 103 compares the new image with each of the pattern images G1 to G3 and selects the pattern image having the lowest similarity.

The control section 100 controls operation of the paper conveyance section 19 to thereby invert the front and the rear of the paper P with the inversion mechanism 20 and directs the paper P, whose front and rear have been inverted, towards the image formation section 12 (S7), and controls operation of the image formation section 12 to thereby cause the pattern image selected by the first selection section 103 to be formed on a surface of the paper P where the existing image is formed (S8).

As a result of formation of a pattern image similar to the new image on a surface (a surface where the existing image is formed) opposite to a formation surface where the new image is formed, there is possibility that the user can no longer easily discriminate the front and the rear of the paper P. For example, in a case where a large "x" is included in the new image, formation of the pattern image G1 (FIG. 4A) at a similar position on the surface (surface where the existing image is formed) of the paper P opposite to the formation surface where the new image is formed possibly makes it difficult to make the discrimination between the front and the rear of the paper P.

In this point, according to the second embodiment, the pattern image having low similarity to the new image (the pattern image selected by the first selection section 103) is formed on the surface (the surface where the existing image is formed) opposite to the formation surface where the new image is formed, thus making it possible to avoid the difficulties in making the discrimination between the front and the rear of the paper P.

FIG. 8 is a functional block diagram schematically illustrating main inner configuration of an image forming apparatus according to a third embodiment. The image forming apparatus according to the third embodiment differs from the image forming apparatus 1 according to the second embodiment illustrated in FIG. 6 in a point that the control unit 10 includes not the first selection section 103 but a second selection section 104. Through operation performed in accordance with the control program stored in the HDD 92, the control unit 10 functions as the control section 100, the operation reception section 101, the similarity judgment section 102, and the second selection section 104.

The second selection section 104 judges, based on the image data of the existing image and the image data of the pattern image, the similarity between the existing image and the pattern image (a judgement technique is the same as that used by the similarity judgment section 102), and selects, from among the plurality of pattern images previously stored in the HDD 92, the pattern image having low similarity to the existing image.

Upon judgement by the similarity judgment section 102 that the similarity between the new image and the existing image is high, the control section 100 causes the pattern image selected by the second selection section 104 to be formed on the surface of the paper P where the existing image is formed.

The formation of the pattern image similar to the existing image on the surface (the surface where the existing image is formed) opposite to the formation surface where the new image is formed makes the pattern image buried in the existing image, making the pattern image hardly visible, which leads to possibility that the user can no longer make the discrimination between the front and the rear of the paper P. For example, in a case where a grid-like image is formed on the existing image, formation of the pattern image G3 (FIG. 4C) on the paper P makes it difficult for the user to recognize the pattern image, which makes it difficult to make the discrimination between the front and the rear of the paper P.

According to the third embodiment, since the image having low similarity to the existing image (the pattern image selected by the second selection section 104) is formed on the surface (the surface where the existing image is formed) opposite to the formation surface where the new image is formed, it is possible to avoid the difficulties in making the discrimination between the front and the rear of the paper P.

According to the third embodiment, the second selection section 104 is included in place of the first selection section 103, but the embodiment is not limited thereto. For example, the control unit 10 may include the first selection section 103 and the second selection section 104, and upon judgment by the similarity judgment section 102 that the similarity between the new image and the existing image is high, the control section 100 may form the pattern image (for example, the same pattern image), common to the pattern image selected by the first selection section 103 and the pattern image selected by the second selection section 104, on the surface of the paper P where the existing image is formed. With this configuration, the pattern image having low similarity between the new image and the existing image (the pattern image common to the pattern image selected by the first selection section 103 and the pattern image selected by the second selection section 104) is formed on the surface (the surface where the existing image is formed) opposite to the formation surface where the new image is formed, thus making it possible to avoid the difficulties in making the discrimination between the front and the rear of the paper P.

Moreover, the present disclosure is not limited to the configuration of the embodiments described above, and various modifications thereto are permitted. In the embodiments described above, a multifunction peripheral is used for the description as one embodiment of the image forming apparatus according to the present disclosure, but it is just one example, and, for example, an image forming apparatus having only a printer function may be used.

Moreover, the configuration and the processing illustrated by the embodiments described above with reference to FIGS. 1 to 8 form just one embodiment of the present disclosure, and the present disclosure is not limited in any way to these configurations and the processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a paper feed section feeding paper;
   a paper conveyance section having: a conveyance path through which the paper is conveyed from the paper feed section towards a discharge tray; and an inversion mechanism of inverting a front and a rear of the paper;
   an image formation section forming, on the paper fed from the paper feed section and conveyed through the conveyance path, an image indicated by image data subjected to image formation;

a paper reading section having an image reading sensor being provided, so as to be at a position opposing the conveyance path, between a downstream side in a paper conveyance direction of the paper feed section and a position where the image formation is performed by the image formation section and reading, by the image reading sensor, an existing image already formed on a surface opposite to a formation surface of a new image newly formed on the paper based on the image data subjected to the image formation by the image formation section;

a storage section storing a pattern image; and a control unit including a processor and, as a result of execution of a control program by the processor, functioning as:

a similarity judgment section judging, based on the image data subjected to the image formation and image data of the existing image obtained through the reading performed by the image reading section, similarity between the new image and the existing image, and a control section, upon judging by the similarity judgment section that the similarity between the new image and the existing image is high, controlling the paper conveyance section and the image formation section to cause the image formation section to form the pattern image stored in the storage section on a surface of the paper where the existing image is formed, and upon not judging by the similarity judgment section that the similarity between the new image and the existing image is high, not causing the image formation section to form the pattern image on the paper.

2. The image forming apparatus according to claim 1, wherein the pattern image is an image formed over an entire surface of the paper by the image formation section.

3. The image forming apparatus according to claim 1, wherein the pattern image is an image formed in a predefined margin region of the paper.

4. The image forming apparatus according to claim 1, wherein as the pattern image, a plurality of pattern images are previously stored in the storage section, as a result of the execution of the control program by the processor, the control unit further functions as a first selection section selecting, from the plurality of pattern images, a pattern image having low similarity to the new image based on the image data subjected to the image formation and image data of the pattern image, and upon judging by the similarity judgment section that the similarity between the new image and the existing image is high, the control section causes the image formation section to form the pattern image selected by the first selection section on the surface of the paper where the existing image is formed.

5. The image forming apparatus according to claim 1, wherein as the pattern image, a plurality of pattern images are previously stored in the storage section, as a result of the execution of the control program by the processor, the control unit further functions as a second selection section selecting, from the plurality of pattern images, a pattern image having low similarity to the existing image based on the image data of the existing image and image data of the pattern image, and upon judging by the similarity judgment section that the similarity between the new image and the existing image is high, the control section causes the image formation section to form the pattern image selected by the second selection section on the surface of the paper where the existing image is formed.

6. The image forming apparatus according to claim 1, wherein as the pattern image, a plurality of pattern images are previously stored in the storage section, as a result of the execution of the control program by the processor, the control unit further functions as:

a first selection section selecting, from the plurality of pattern images, a pattern image having low similarity to the new image based on the image data subjected to the image formation and image data of the pattern image; and a second selection section selecting, from the plurality of pattern images, a pattern image having low similarity to the existing image based on the image data of the existing image and image data of the pattern image, and upon judging by the similarity judgment section that the similarity between the new image and the existing image is high, the control section causes the image formation section to form the pattern image, common to the pattern image selected by the first selection section and the pattern image selected by the second selection section, on the surface of the paper where the existing image is formed.

7. The image forming apparatus according to claim 1, wherein based on the image data subjected to the image formation and the image data of the existing image obtained through the reading performed by the paper reading section, the similarity judgment section detects sameness between the new image and the existing image through pattern matching, and judges that the similarity between the new image and the existing image is high in a case where the sameness between the both images detected through the pattern matching is equal to or greater than a predefined threshold value.

* * * * *